US010111235B2

United States Patent
Singh et al.

(10) Patent No.: US 10,111,235 B2
(45) Date of Patent: Oct. 23, 2018

(54) METHODS FOR CENTRALIZED CHANNEL SELECTION ACROSS DIFFERENT CELLS IN A RADIO ACCESS NETWORK

(71) Applicant: SpiderCloud Wireless, Inc., Milpitas, CA (US)

(72) Inventors: Jaspreet Singh, San Diego, CA (US); Tsung-Yi Chen, San Diego, CA (US); Hithesh Nama, San Jose, CA (US)

(73) Assignee: SpiderCloud Wireless, Inc., Milpitas, CA (US)

( * ) Notice: Subject to any disclaimer, the term of this patent is extended or adjusted under 35 U.S.C. 154(b) by 0 days.

(21) Appl. No.: 15/433,352

(22) Filed: Feb. 15, 2017

(65) Prior Publication Data

US 2017/0238325 A1    Aug. 17, 2017

Related U.S. Application Data

(60) Provisional application No. 62/295,214, filed on Feb. 15, 2016.

(51) Int. Cl.
| | |
|---|---|
| *H04W 4/00* | (2018.01) |
| *H04W 72/08* | (2009.01) |
| *H04L 5/00* | (2006.01) |
| *H04W 72/04* | (2009.01) |

(52) U.S. Cl.
CPC ......... *H04W 72/082* (2013.01); *H04L 5/0032* (2013.01); *H04W 72/048* (2013.01); *H04W 72/0453* (2013.01)

(58) Field of Classification Search
None
See application file for complete search history.

(56) References Cited

U.S. PATENT DOCUMENTS

| | | |
|---|---|---|
| 7,327,697 B1 | 2/2008 | Friday et al. |
| 2007/0280175 A1 | 12/2007 | Cheng |

(Continued)

OTHER PUBLICATIONS

Author Unknown, "Technical Specification Group Radio Access Network; Evolved Universal Terrestrial Radio Access (E-UTRA); Radio Resource Control (RRC); Protocol specification (Release 12)," Technical Specification 36.331, Version 12.2.0, Jun. 2014, 3GPP Organizational Partners, 365 pages.

(Continued)

*Primary Examiner* — Phirin Sam
(74) *Attorney, Agent, or Firm* — C. Keith Montgomery

(57) ABSTRACT

A method is shown for allocating a plurality of channels to a plurality of radio nodes (RNs) in a radio access network (RAN). In accordance with the method, an initial RN is selected from among the plurality of RNs. A first of the plurality of channels is assigned to the initial RN. The first channel is selected such that external interference experienced by the initial RN from sources other than the RAN on the first channel is minimized. A second RN is selected from among the plurality of RNs. A second of the plurality of channels is assigned to the second RN. The second channel is selected such that a metric reflective of an information carrying capacity of the RNs that have already been assigned one of the plurality of channels is maximized. The assigned channels are allocated to the respective RNs to which they have been assigned.

25 Claims, 5 Drawing Sheets

(56) References Cited

U.S. PATENT DOCUMENTS

| | | | |
|---|---|---|---|
| 2009/0175238 A1* | 7/2009 | Jetcheva | H04W 72/0453 370/329 |
| 2009/0191906 A1 | 7/2009 | Abedi | |
| 2011/0194483 A1* | 8/2011 | Ji | H04W 36/0033 370/315 |
| 2012/0083203 A1* | 4/2012 | Truong | H04W 52/46 455/10 |
| 2013/0077597 A1* | 3/2013 | Nukala | H04B 7/0417 370/330 |
| 2013/0329692 A1* | 12/2013 | Vrzic | H04W 72/0453 370/329 |
| 2015/0043464 A1* | 2/2015 | Lu | H04W 72/04 370/329 |
| 2015/0085790 A1* | 3/2015 | Morosawa | H04L 12/40169 370/329 |
| 2015/0133129 A1 | 5/2015 | Chiang et al. | |
| 2015/0163722 A1* | 6/2015 | Pasad | H04B 7/155 370/315 |
| 2015/0201415 A1* | 7/2015 | Jetcheva | H04W 72/0453 370/235 |
| 2015/0245368 A1* | 8/2015 | Nukala | H04B 7/0417 370/330 |
| 2016/0007362 A1 | 1/2016 | Ayadurai et al. | |
| 2016/0244527 A1* | 8/2016 | Kavlie | C07K 16/2866 |
| 2017/0244514 A1* | 8/2017 | Hu | H04L 1/0003 |

OTHER PUBLICATIONS

International Search Report and Written Opinion for PCT/US17/17898, dated May 5, 2017, 9 pages.

* cited by examiner

METHODS FOR CENTRALIZED CHANNEL SELECTION ACROSS DIFFERENT CELLS IN A RADIO ACCESS NETWORK

Operators of mobile systems, such as universal mobile telecommunications systems (UMTS) and its offspring including LTE (long term evolution) and LTE-advanced, are increasingly relying on wireless small cell radio access networks (RANs) in order to deploy indoor voice and data services to enterprises and other customers. Such small cell RANs typically utilize multiple-access technologies capable of supporting communications with multiple users using radio frequency (RF) signals and sharing available system resources such as bandwidth and transmit power.

One resource that is limited in mobile systems is spectrum (a band of frequencies over which communication can take place). Accordingly, frequency reuse plans can be utilized to share the same resources between different cells. The frequency reuse factor is the rate at which the same frequency can be used in the network. For instance, a frequency reuse factor of 1 indicates that all cells in the system use all available frequencies. While a frequency reuse factor of 1 is a spectrally efficient reuse scheme, reusing the same resources in all cells all the time can result in interference issues. While systems that employ higher frequency reuse factors can reduce interference, only a small fraction of the total available frequency resources will be used in each cell. Orthogonal frequency-division multiple access based systems such as LTE are generally being deployed with a frequency reuse factor of 1. Since such systems do not spread the signal across the total available frequency band, inter-cell radio resource management is important to coordinate resource allocation between different cell sites and to limit the inter-cell interference.

Recently, LTE systems have begun to extend their operation into unlicensed frequency bands such as the 5 GHz band, which is currently primarily used by WiFi systems conforming to the IEEE 802.11 specification. Some of the Technical specifications being developed for the use of LTE technology with unlicensed spectrum include LTE-U (LTE-unlicensed, being developed by the LTE-U forum), 3GPP LAA (Licensed Assisted Access) and MulteFire (being developed by the MulteFire forum). Because of the additional frequency resources that are made available by the use of an unlicensed frequency band it is possible to assign different, non-overlapping channels to different cells, simultaneously allowing system capacity improvements and reductions in interference.

One issue that needs to be addressed when assigning different, non-overlapping channels across the different cells in a mobile system concerns the optimal allocation of channels.

SUMMARY

In accordance with one aspect of the subject matter described herein, a method is shown for allocating a plurality of channels to a plurality of radio nodes (RNs) in a radio access network (RAN). In accordance with the method, an initial RN is selected from among the plurality of RNs. A first of the plurality of channels is assigned to the initial RN. The first channel is selected such that external interference experienced by the initial RN from sources other than the RAN on the first channel is minimized. A second RN is selected from among the plurality of RNs. A second of the plurality of channels is assigned to the second RN. The second channel is selected such that a metric reflective of an information carrying capacity of the RNs that have already been assigned one of the plurality of channels is maximized. The assigned channels are allocated to the respective RNs to which they have been assigned.

In some embodiments the RNs in the RAN operate using at least one pre-established channel prior to assigning the plurality of channels, with the pre-established channel being a licensed channel and the channels in the plurality of channels being unlicensed channels. In this case the RAN may operate, for instance, in accordance with LTE-U.

DETAILED DESCRIPTION

Figure 1:
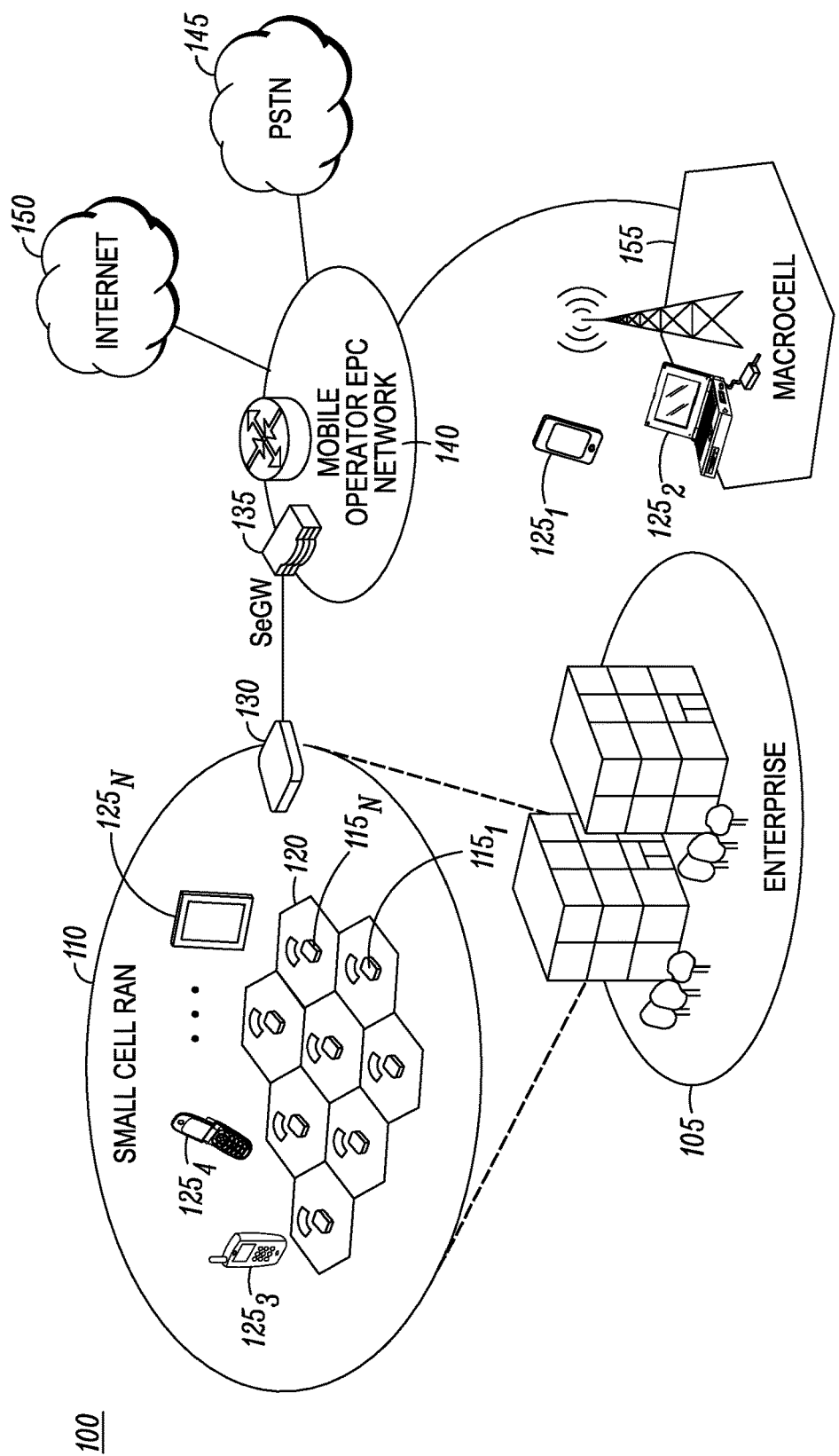
FIG. 1 shows an enterprise in which a small cell radio access network (RAN) is implemented.

Various systems, methods, and apparatuses are described in which unlicensed spectrum is used for LTE communications. However, the techniques described herein are not limited to LTE-based technologies (e.g., LTE-U, LAA), and may also be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of illustration, and LTE terminology is used in much of the description below, although the techniques are applicable beyond LTE applications. In this description, LTE-Advanced (LTE-A) communications are considered to be a subset of LTE communications, and therefore, references to LTE communications encompass LTE-A communications.

As previously mentioned, the cells in an LTE Radio Access Network (RAN) generally use the same licensed frequency. With the availability of unlicensed channels in LTE-U systems, it becomes possible to assign additional unlicensed channels to the cells. In some cases the various cells in a system may be assigned different, non-overlapping channels.

Channel selection is generally performed locally, without fully considering its impact on the overall system. However, a more optimal channel allocation scheme requires a global analysis of different schemes on the entire system. In order to determine the overall system impact of a channel allocation scheme on a mobile system, a central processor or other entity is needed which can communicate with each base station in the system. (Alternatively, if the different base stations could communicate directly with each other, such operations may still be performed, however this incurs significant communication overhead compared to the scenario where a central processor is utilized), Some RANs employ an access controller that can be used to perform this task. One example of an access controller that operates in a mobile (small cell) RAN is the SpiderCloud services node, available from SpiderCloud Wireless, Inc. This services node is illustrated below in FIG. 1 in the context of a mobile communications environment in which the services node controls individual radio nodes (which are equivalent to base stations that communicate with mobile stations) in a RAN.

FIG. 1 shows an enterprise 105 in which a small cell RAN 110 is implemented. The small cell RAN 110 includes a plurality of radio nodes (RNs) $115_1 \ldots 115_N$. Each radio node 115 has a radio coverage area (graphically depicted in the drawings as hexagonal in shape) that is commonly termed a small cell. A small cell may also be referred to as a femtocell, or using terminology defined by 3GPP as a Home Evolved Node B (HeNB). In the description that follows, the term "cell" typically means the combination of a radio node and its radio coverage area unless otherwise indicated. A representative cell is indicated by reference numeral 120 in FIG. 1.

The size of the enterprise 105 and the number of cells deployed in the small cell RAN 110 may vary. In typical implementations, the enterprise 105 can be from 50,000 to 500,000 square feet and encompass multiple floors and the small cell RAN 110 may support hundreds to thousands of users using mobile communication platforms such as mobile phones, smartphones, tablet computing devices, and the like (referred to as "user equipment" (UE) and indicated by reference numerals 1251-N in FIG. 1).

The small cell RAN 110 includes an access controller 130 that manages and controls the radio nodes 115. The radio nodes 115 are coupled to the access controller 130 over a direct or local area network (LAN) connection (not shown in FIG. 1) typically using secure IPsec tunnels. The access controller 130 aggregates voice and data traffic from the radio nodes 115 and provides connectivity over an IPSec tunnel to a security gateway SeGW 135 in an Evolved Packet Core (EPC) 140 network of a mobile operator. The EPC 140 is typically configured to communicate with a public switched telephone network (PSTN) 145 to carry circuit-switched traffic, as well as for communicating with an external packet-switched network such as the Internet 150.

The environment 100 also generally includes Evolved Node B (eNB) base stations, or "macrocells", as representatively indicated by reference numeral 155 in FIG. 1. The radio coverage area of the macrocell 155 is typically much larger than that of a small cell where the extent of coverage often depends on the base station configuration and surrounding geography. Thus, a given UE 125 may achieve connectivity to the network 140 through either a macrocell or small cell in the environment 100.

Figure 2:
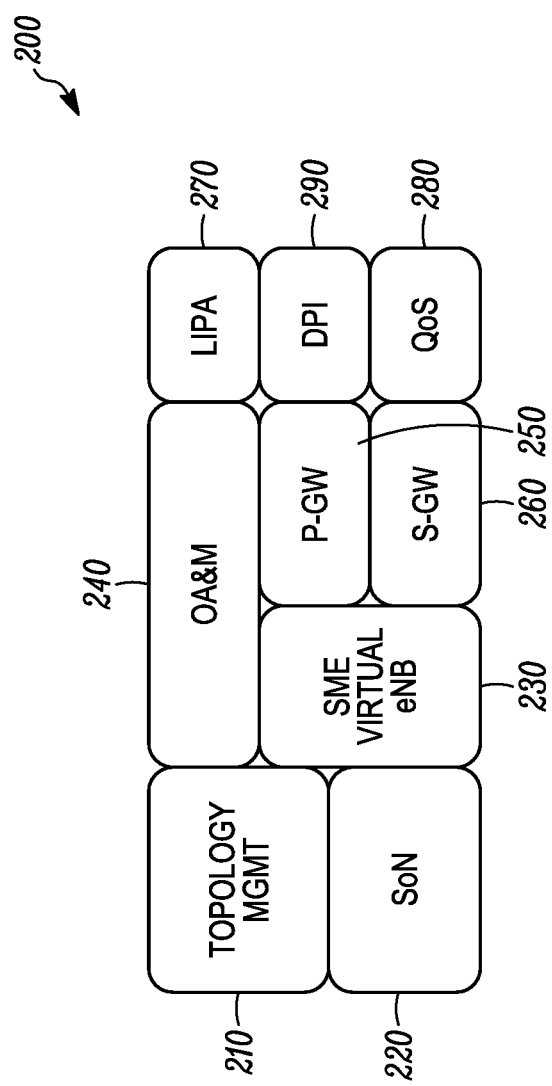
FIG. 2 shows a functional block diagram of one example of an access controller such as the SpiderCloud services node.

As previously mentioned, one example of an access controller is the SpiderCloud Services Node, available from SpiderCloud Wireless, Inc. FIG. 2 shows a functional block diagram of one example of an access controller such as the SpiderCloud services node. The access controller may include topology management 210, self-organizing network (SON) 220, radio resource management (RRM), a services node mobility entity (SME) 230, operation, administration, and management (OAM) 240, P-GW 250, S-GW 260, local IP access (LIPA) 270, QoS 280, and deep packet inspection (DPI) 290 functionality. Alternative embodiments may employ more or less functionality/modules as necessitated by the particular scenario and/or architectural requirements. Because the services node described above is in communication with the entire RAN, it is able to assess the impact of a particular channel assignment on the level of the whole system. Accordingly, it may be used as part of a real time, deployment-based, process for performing system level optimization of performance metrics based on various design choices. In particular, it may be used as part of a process for assigning channels in an unlicensed frequency band to different cells in a mobile system.

In some embodiments the access controller may be incorporated into a cloud-based gateway that may be located, for example, in the mobile operator's core network and which may be used to control and coordinate multiple RANs. Examples of such a gateway are shown in co-pending U.S. application Ser. Nos. 15/059,235 and 15/081,311, which are hereby incorporated by reference in their entirety.

Examples of a technique for selecting such channels in an optimal manner are shown below. Of course, these techniques are not limited to the particular small cell RAN or the particular access controller shown above, which are presented for illustrative purposes only. Moreover, all of these techniques may be used to perform channel selection in the presence of Wi-Fi networks or other LTE-U/LAA networks and without the presence of other interfering networks. It should also be noted that, while this disclosure describes the applications in the context of unlicensed spectrum bands, methods disclosed here can be applied generally to any scenario where a set of frequency channels needs to be allocated across different cells.

Centralized Sequential Channel Selection

In a first channel assignment technique, referred to herein as the centralized sequential channel selection technique, the radio nodes are assumed to be initially operational using a licensed band. In the context of LTE-U or LAA, each radio node will have two carriers or channels—one licensed and another unlicensed. This technique starts by assigning one of the radio nodes one of the unlicensed channels and proceeds one-by-one through all the radio nodes while assigning them unlicensed channels. Thus, it is necessary to decide which node to begin with. Then it is necessary to determine how the next node to be assigned an unlicensed channel is to be selected and how the unlicensed channel it is to be assigned is to be selected. In one embodiment, these decisions may be made in the manner described below, in which various parameters are used which may be defined as follows.

Let $S=\{1, 2, \ldots, N\}$ be the set of radio nodes in the RAN.

Let R(i,j) be the RSRP (received signal power) received by radio node j from node i on the licensed channel that the RAN employs.

In one embodiment, the values of R(i,j) may be determined from a REM (radio environment monitoring) scan on the licensed channel. During each REM scan, one radio node in the RAN transmits at its maximum power and all the other radio nodes determine the power received from that transmitting radio node. This process is repeated until every radio node has scanned every other radio node. The results of these measurements provide the transmitted and received powers between each of the radio nodes in the RAN.

The following metrics, defined below, are also used by the centralized sequential channel selection technique.

The Internal Interference Metric (IIM) of a radio node to a set of nodes (not including itself) is defined as the sum of the RSRPs from this node to other nodes in the set. This metric therefore describes the interference caused by a node at other nodes in its own network.

The External Interference Metric (EIM) of a radio node is defined as the measured interference at the node, from WiFi or other LTE-U networks on an unlicensed channel. A separate metric is determined for each unlicensed channel.

The system capacity of the set of nodes in a RAN may be defined as the sum over all nodes in the system of $\{-\log(IIM(S\_c\_n)+EIM(c\_n))\}$, where $S\_c\_n$ is the subset of the nodes that share the same unlicensed channel as node n and $c\_n$ is the unlicensed channel used by node n. That is, the system capacity may be written in full as:

$$\text{System capacity} = \text{Sum}\_n\{-\log(IIM(S\_c\_n)+EIM(c\_n))\}$$

This definition of the system capacity metric is loosely based on the well-known Shannon channel capacity formula, which provides an upper bound on the rate at which information can be reliably transmitted over a communications channel. According to the formula, the channel capacity is proportional to the logarithm of the signal to noise ratio (SNR) of a channel being transmitted over a communication link. Since the SNR is defined as the signal power/(noise+interference), and because the signal power is assumed to be the same for all the radio nodes, the channel capacity for all links the system, referred to as the system capacity metric, is effectively proportional to the equation presented above and reflects the information carrying capacity of the system.

Of course, this definition of the system capacity is only an approximate, relative measure of the actual information carrying capacity of the system since it does not account for the actual location of a user's UE in any given cell of the RAN. That is, it approximates the interference that is seen across the entire cell using the metrics IIM and EIM, which can be determined without requiring any measurements that involve user communication devices. Moreover, this definition of the system capacity is presented by way of illustration only. More generally, any suitable metric that is indicative of the system capacity may be employed.

In a final set of definitions, the assigned set of nodes is defined as the set of nodes that have already been assigned an unlicensed channel and the non-assigned set of nodes is defined as the set of nodes that have not yet been assigned an unlicensed channel.

Figure 3:
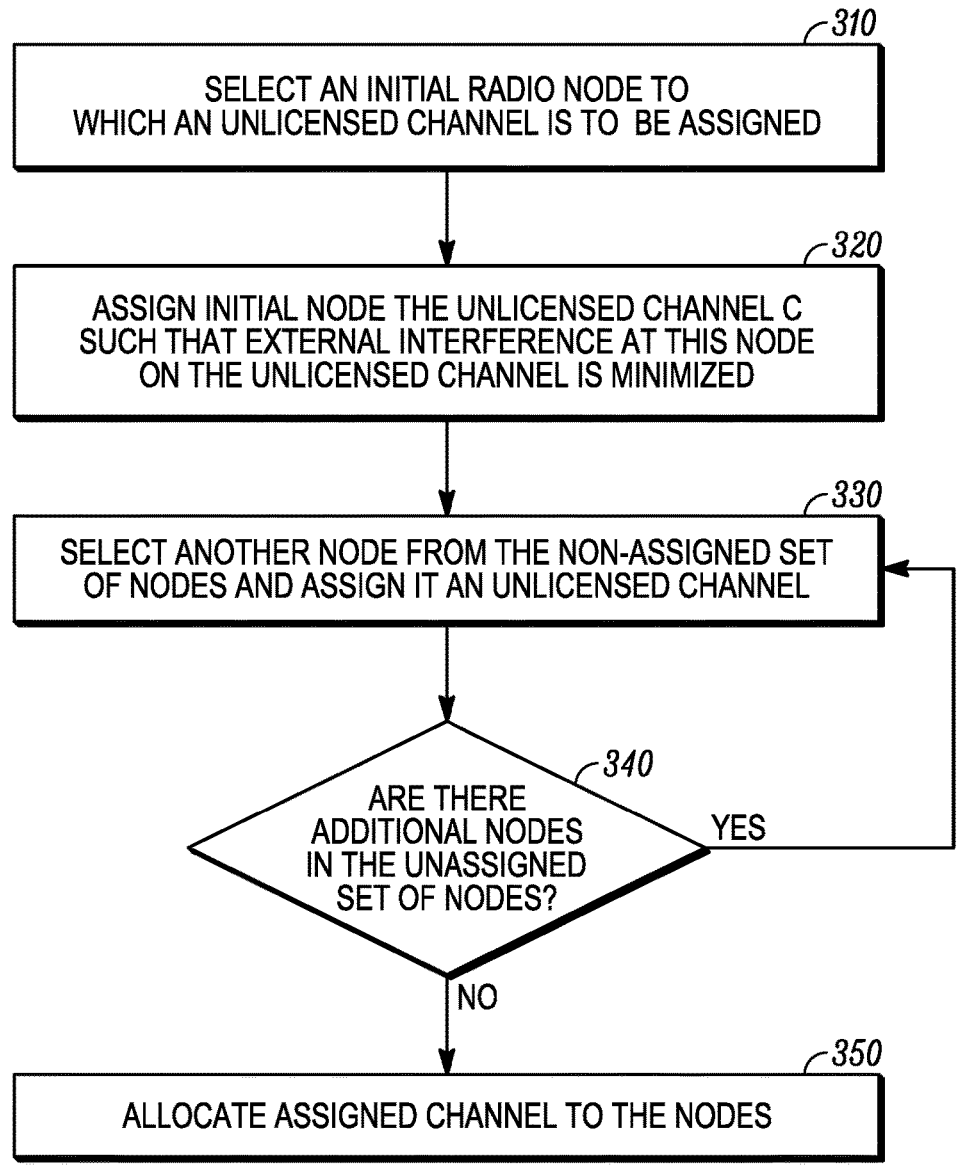
FIG. 3 is a flowchart showing one example of a method for assigning unlicensed channel to the radio nodes (RNs) in a RAN.

Given the various parameters and metrics defined above, the centralized sequential channel selection technique may proceed as shown in the flowchart of FIG. 3. In one embodiment this technique, may be performed by the access controller in FIG. 1. First, at block 310, an initial radio node is selected to which an unlicensed channel is to be assigned.

In one embodiment, the initial node that is selected is the node that causes the largest IIM at its neighboring radio nodes. Next, at block 320, this node is assigned the unlicensed channel c such that the external interference EIM(c) at this node on the unlicensed channel is minimized.

After the initial node has been assigned an unlicensed channel in the manner specified above, the process continues until all the radio nodes in the system have been assigned an unlicensed channel. In particular, at block 330 another node is selected from the non-assigned set of nodes. The selected node and its assigned channel should be chosen so that the new assigned set of nodes gives rise to the largest system capacity. The process then proceeds to decision block 340. If it is found at block 340 that there are additional nodes in the unassigned set, then the process returns to block 330 and another node is selected from the unassigned step. This sequence repeats until all nodes have been assigned an unlicensed channel, at which point the process proceeds to block 350, where the channel assignments that have been determined are physically allocated to the respective nodes.

In one alternative embodiment, the initial node to which a channel is assigned may be chosen in accordance with a criterion other than the one specified at block 310. In yet another alternative embodiment, the initial node may be randomly selected from among the set of nodes.

Greedy Channel Selection Technique

In accordance with the greedy channel selection technique, the nodes in the system are selected in a random order and assigned an unlicensed channel one by one. For node n, the unlicensed channel $c\_n$ is assigned such that the total interference $IIM(S\_c\_n)+EIM(c\_n))$ is minimized, where, as before, $S\_c\_n$ is the subset of nodes that have been assigned the channel $c\_n$.

Centralized Best-Of-K Greedy Channel Selection Technique

In accordance with the centralized best-of-k greedy channel selection technique, the greedy channel selection technique is conducted k times, with the nodes being selected in a different random order during each of the k trials. Each trial provides one potential allocation of the channels to the different nodes. Of the k allocations, the allocation is picked that maximizes the 'system capacity,' which may be defined as the average spatial spectral efficiency of the system.

Figure 4:
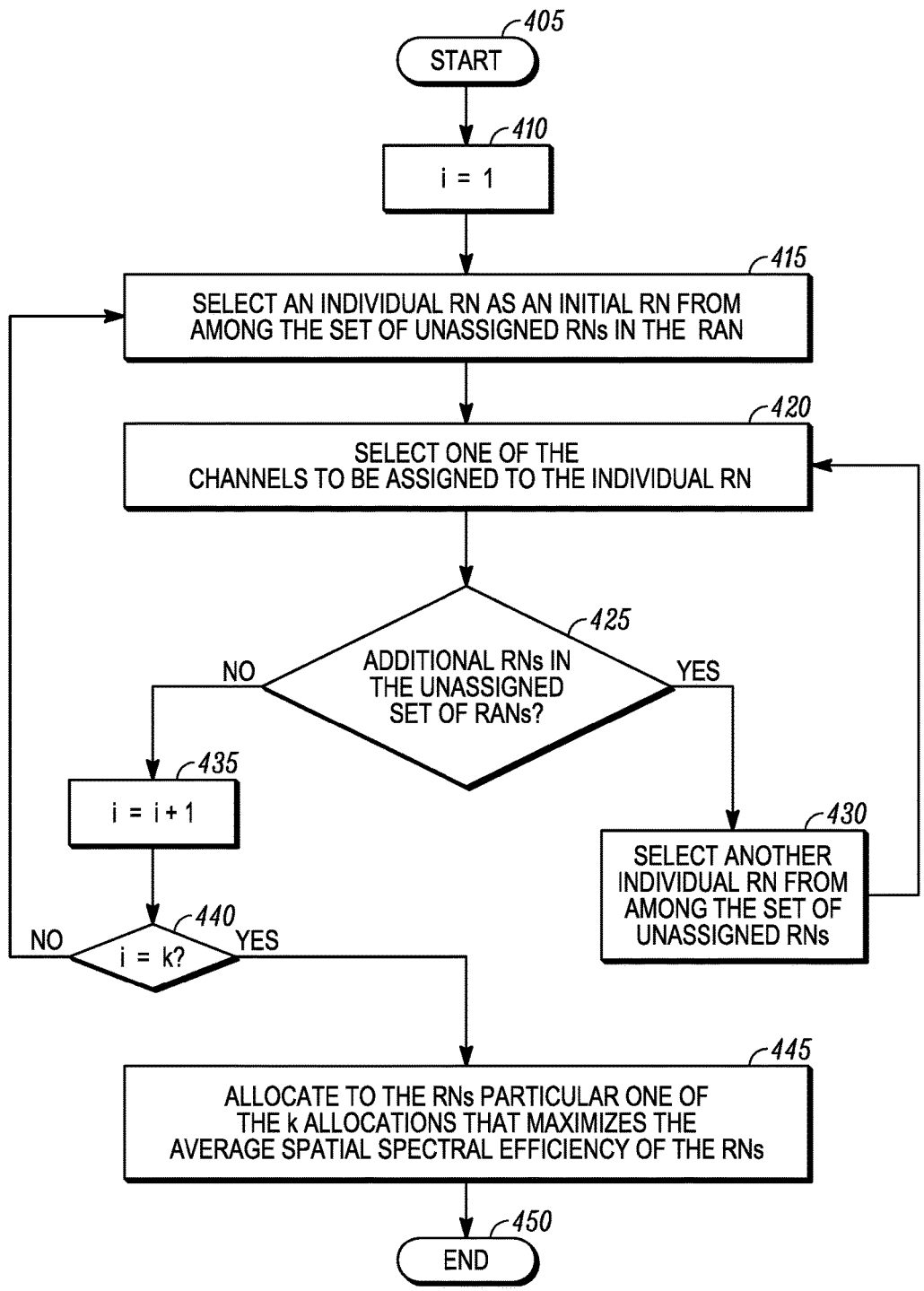
FIG. 4 is a flowchart showing another example of a method for assigning unlicensed channel to the radio nodes (RNs) in a RAN.
Figure 5:
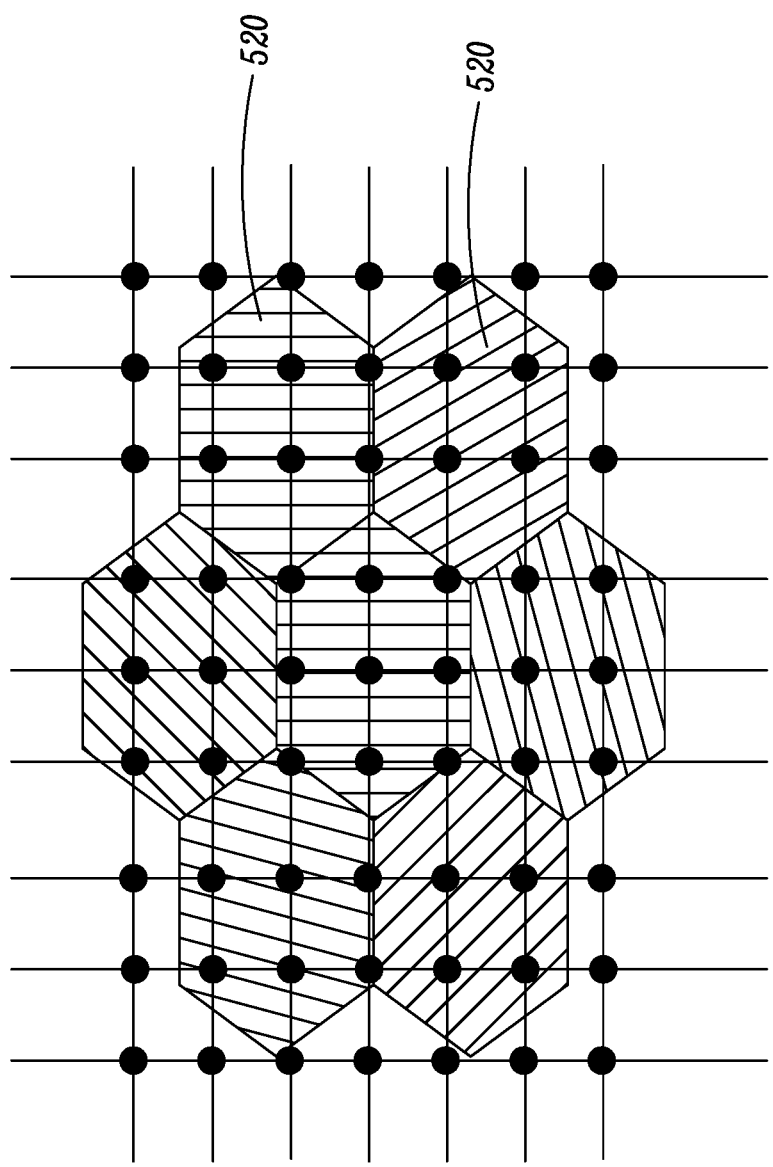
FIG. 5 shows a series of cells in a RAN overlaid with a dense grid of points.

FIG. 4 is flowchart showing the overall centralized best-of-k greedy channel selection technique, which, in one embodiment, may be performed by the access controller in FIG. 1. The method begins at block 405 and continues to an initialization block 410 in which i is initialized to 1, indicating that the first allocation of channels to the RNs is to begin. Next, at block 415 the first assignment of channels begins when an individual RN is selected from among the set of unassigned RNs in the RAN. Next, at block 420 one of the channels is selected and assigned to the individual RN. The channel is selected such that the sum of the internal interference caused by the individual RN on all other RNs in the RAN that are assigned this channel, plus the external interference experienced by the individual RN from sources other than the RAN on this channel, is minimized. At block 425 it is determined if there are additional RNs in the unassigned set of RANs to which channels need to be assigned. If so, then at block 430 another individual RN is selected from among the set of unassigned RNs, after which the process returns to block 420. Blocks 420-430 are then repeated until all the RNs in the set of unassigned RNs have been assigned one of the channels.

Once all the RNs have been assigned a channel the process proceeds from block 425 to block 435, where i is incremented by 1. At decision block 440 it is determined if i is equal to k. If not, the process returns to block 415 and the RNs are assigned different channels. That is, blocks 415-430 are repeated k times, with the RNs being selected in a different sequence during each repetition so that the RNs are potentially assigned different channels each time. Once k assignments of channels have been achieved at block 440, the process continues to block 445, where the channels are physically allocated to the RNs in accordance with the particular one of the k assignments that maximizes the average spatial spectral efficiency of the RNs. The process then ends at block 450.

In one embodiment, the system capacity metric as defined above for the centralized channel selection technique may be employed. However, this metric suffers some from a significant limitation. In particular, it only approximates the interference seen by all UEs across the coverage area of each cell because it is only a measurement seen at the radio node itself. Accordingly, it may be desirable to use an alternative system capacity metric. For instance, in one example, presented below, the system capacity may be predicted for a given assignment of unlicensed channels to the nodes in the system.

In this technique, UE measurement reports are used by the centralized services node in order to predict the average spatial spectral efficiency for different potential design choices (i.e., allocations of unlicensed channels). The UE measurement report provides signal strength measurements made by a UE of the signals received from different radio nodes. The optimizing design choice can then be employed for operation.

In order to compute a system level performance metric such as the average spatial spectral efficiency, knowledge of a derivative such as the signal-to-interference+noise ratio (SINR) across the system is needed. The SINR may be defined as:

$$SINR = \frac{\text{Received power from serving cell}}{\text{Sum of received powers from interfering cells} + \text{Noise power}}$$

The SINR needs to be known at all spatial locations across the system. That is, the SINR(x) is needed for all x, where x denotes the spatial coordinates of a point in the system (i.e., the RAN deployment). So, typically, the system metric would be System metric=$E_x(f(SINR(x)))$ Where f( ) is the metric of interest (i.e., the average spatial spectral efficiency), and $E_x($ ) denotes the expectation operator based on the probability distribution of the location x, e.g., x can be uniformly distributed across the cell coverage area.

In practice, instead of determining the SINR or other derivative for every point x, the system performance can be approximated by evaluating the system metric over a dense grid of points, as illustrated in FIG. 4 for cells 320. Even still, evaluating the SINR at a finite number of points in the system remains highly challenging because it would require knowledge of the exact geographic topology, and the ability to construct the exact propagation/path loss models at all points on the grid. However, this problem can be overcome by using measurement data obtained from UEs that communicate with the RNs in the RAN. That is, the UEs can report data such as the signal power they receive from the RNs. The RNs in turn forward the data to the access controller. Given enough data points from the UEs, which presumably come from a sufficiently large sample of locations in the system, the system metric in question can be approximated based on the real-world data from the UEs. This approach has the added benefit that the metric of interest is optimized for the locations where users are most likely to be connected to and using the RAN.

In one embodiment, the measurement data may be obtained from Radio Resource Control (RRC) Measurement Reports. Such reports are generated by a UE when the UE receives RF signals from the serving cell RN and potential RNs to which the UE may be handed off. The RRC measurement reports include data pertaining to signal measurements of signals received by the UE from various RNs. There are multiple HO-triggering or Measurement Report-triggering events (generally referred to herein as a triggering event) defined for an LTE cellular network. When the criteria or conditions defined for a triggering event are satisfied, the UE will generate and send a Measurement Report to its serving cell RN. Currently, there are eight different triggering events defined for E-UTRAN in section 5.5.4 of the 3GPP Technical Specification (TS) 36.331, version 12.2.0 (June 2014), titled "$3^{rd}$ Generation Partnership Project; Technical Specification Group Radio Access Network; Evolved Universal Terrestrial Radio Access (E-UTRA); Radio Resource Control (RRC); Protocol specification (Release 12)."

Measurement data may be obtained from RRC measurement reports that are both event-triggered and periodically generated. Illustrative event-triggered reports include, without limitation, handover events (e.g., A3/A4/A5/A6/B1/B2 for LTE, 1c/1d for UMTS) and serving cell coverage events (e.g., A1/A2 for LTE, 1a/1b for UMTS). The measurement data that may be included in the reports from which SINR may be approximated include one or more of the following parameters: RSRP, RSRQ for LTE, RSCP, RSSI, Ec/Io for UMTS and CQI reports for both LTE and UMTS.

The system performance metric is to be determined as a function of a selected design choice (i.e., the allocation of unlicensed channels to the nodes). Thus, the system metric may be expressed as:

System metric (design choice)=$E_x(f(SINR(x,\text{design choice})))$

Note that the SINR is a function of both the spatial location x and the design choice.

In one embodiment, the SINRs are predicted using PCI (to identify the cell) and RSRP data. Thus, if a UE sends a measurement report from each of k cells that it receives a signal from, a UE report may be assembled from the various reports as follows:

$UE_{report}=[(PCI_1,RSRP_1);(PCI_2,RSRP_2); \ldots (PCI_K, RSR^K)]$

Where the set of reports is represented by:

$S_R=[UE\text{report}_1, UE\text{report}_2, \ldots, UE\text{report}_R]$

Each UE report can be used to predict the SINR that would be achieved by a UE at the corresponding location for the given design choice. Once a sufficient number of measurement reports are received, a set of derivatives such as the SINR can be predicted for a dense spatial data points within the entire coverage area of the RAN. From this the desired system performance metric can be determined. Specifically, the expectation over x (i.e., over space) can be replaced with the expectation over the set of UE measurement reports, as follows System metric (design choice)=$E_y(f(\text{SINR}(y,\text{design choice})))$, where y denotes a measurement report. One example of a distribution of y could be the uniform distribution where all measurement reports are equally weighted. Another example could be an exponential distribution over time with older measurements being accorded lower probability than more recent measurements.

An example will now be presented to illustrate the method described above. Of course, the exact determination of the SINR (y, design choice) will vary depending on the system performance metric that is chosen and the design choice being optimized for that system performance metric.

Here the system metric of interest is the average spatial spectral efficiency and the design choice to be optimized is the allocation of unlicensed channels to the nodes. Let N=number of cells and denote $C=\{C_1, C_2, \ldots, C_N\}$ as one particular choice of the allocated unlicensed channels. Assume that the measurement report from a typical UE is:

$$y=[(PCI_1,RSRP_1);(PCI_2,RSRP_2); \ldots (PCI_K,RSRP_K)]$$

The K PCIs reported by the UE are the PCIs for the K (out of N) cells from which the UE received a signal.

Using this report, the vector of RSRPs from the different cells can be defined, arranged according to the cell numbering scheme $\{1:N\}$, i.e., define $RSRP_{vec}=\{R_1, R_2, \ldots, R_N\}$ (where only K out of these N values would be non-zero, as the UE detected only K cells).

Assuming that cell 'm' is the serving cell, the predicted SINR at the spatial location from which the UE report is sent is:

$$SINR = \frac{\text{Received power from serving cell}}{\text{Sum of received power from other cells using the same unlicensed channel} + \text{noise power}}$$

$$= \frac{R_m}{\sum_{\substack{i:C_i=C_m \\ (i \neq m)}} R_i + EIM(C_m) + \text{noise power}}$$

The first term in the denominator captures the internal interference from the same network's nodes, while the second term captures the external interference from Wi-Fi and other operator LTE-U networks.

The external interference values could be obtained via UE measurement feedback (e.g., UE could feedback Wi-Fi measurements and/or other operator LTE-U measurements (e.g., via ANR methods) on the different channels). Alternatively, UEs could simultaneously (or separated by a short time interval) report measurements on the different channels, or they could report only one (or a subset) of the channels at once. In this case measurement reports collected at different points in time (but having similar signatures, such as similar RSRP values from neighboring cells in the RAN) may be clustered (combined together) to obtain the external interference across all channels. In yet another alternative, the external interference values may be obtained by extrapolation, based on the measurements made at the locations of the radio nodes. In a simpler implementation, the interference measured at the serving radio node could be used directly.

Several aspects of telecommunication systems will now be presented with reference to access controllers, base stations and UEs described in the foregoing description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionalities described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable media. Computer-readable media may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable media for storing or transmitting software. The computer-readable media may be resident in the processing system, external to the processing system, or distributed across multiple entities including the processing system. Computer-readable media may be embodied in a computer-program product. By way of example, a computer-program product may include one or more computer-readable media in packaging materials. Those skilled in the art will recognize how best to implement the described functionality presented throughout this disclosure depending on the particular application and the overall design constraints imposed on the overall system.

The invention claimed is:

1. A method for allocating a plurality of channels to a plurality of radio nodes (RNs) in a Radio Access Network (RAN), comprising:
   i. selecting an initial RN from among the plurality of RNs;
   ii. assigning a first channel of the plurality of channels to the initial RN, the first channel being selected such that external interference experienced by the initial RN from sources other than the RAN on the first channel is minimized;
   iii. selecting another RN from among the plurality of RNs;
   iv. assigning a second channel of the plurality of channels to said another RN, the second channel being selected such that a metric reflective of an information carrying capacity of the RNs that have already been assigned one of the plurality of channels is maximized; and
   v. allocating the assigned channels to the respective RNs to which they have been assigned.

2. The method of claim 1, further comprising repeating steps (iii)-(v) for any remaining ones of the plurality of RNs in the RAN.

3. The method of claim 1, wherein channels in the plurality of channels are unlicensed channels.

4. The method of claim 1, wherein selecting the initial RN includes selecting an RN that causes a metric reflective of internal interference caused by the selected node RN at all other RNs in the plurality of RNs to be minimized.

5. The method of claim 4, wherein the plurality of RNs in the RAN operate using at least one pre-established channel prior to assigning the plurality of channels and further comprising determining the metric reflective of internal interference from radio environment monitoring (REM) scans on the at least one pre-established channel.

6. The method of claim 5, wherein the pre-established channel is a licensed channel and channels in the plurality of channels are unlicensed channels.

7. The method of claim 1, wherein the metric reflective of the information carrying capacity of the RNs is based at least in part on a metric reflective of internal interference caused by each RN at all other RNs in the plurality of RNs on the respective channel it has been assigned and the external interference experienced by each RN on the respective channel it has been assigned from sources other than the RAN.

8. The method of claim 1, wherein selecting the initial RN includes selecting the initial RN in a random manner.

9. A method for allocating a plurality of channels to a plurality of radio nodes (RNs) in a radio access network (RAN), comprising:
   i. selecting an individual RN from among a set of unassigned RNs in the plurality of RNs;
   ii. selecting a first channel of the plurality of channels to be assigned to the individual RN, the first channel being selected such that internal interference caused by the individual RN on all other RNs in the RAN that are assigned the first channel plus external interference experienced by the individual RN from sources other than the RAN on the first channel is minimized;
   iii. repeating steps (i) and (ii) for each of the RNs in the set of unassigned RNs to obtain a first assignment of the plurality of channels, wherein the individual RNs are selected in a first sequence;
   iv. repeating steps (i)-(iii) k times, k being an integer greater than 2, to obtain k assignments of the plurality of channels, the individual RNs being selected in a different sequence during each repetition;
   v. allocating one of the k assignments of the plurality of channels to the RNs in the plurality of RNs, the allocated one of the k assignments being the assignment that maximizes an information carrying capacity of the RNs.

10. The method of claim 9, further comprising predicting the information carrying capacity of the plurality of RNs for each of the k assignments.

11. The method of claim 10, wherein predicting the information carrying capacity of the plurality of RNs for each of the k assignments comprises processing one or more measurement values obtained from messages received by the RNs from a plurality of user equipments (UEs) to compute a set of derivatives and determining the information carrying capacity of the RNs as a function of the computed set of derivatives.

12. The method of claim 11, wherein the set of derivatives comprises a signal-to-interference-and-noise ratio (SINR) at a plurality of spatial locations in an environment at which the plurality of UEs are located when the one or more measurement values in the messages are measured.

13. The method of claim 11, wherein the messages are Radio Resource Control (RRC) measurement reports.

14. The method of claim 11, wherein the one or more measurement values include a received signal power (RSRP) received from a specified cell.

15. The method of claim 1, wherein steps (i)-(v) are performed by a centralized controller that is in communication with each of the plurality of RNs.

16. The method of claim 9, wherein steps (i)-(v) are performed by a centralized controller that is in communication with each of the plurality of RNs.

17. A centralized controller operable in a cell in a small cell radio access network (RAN), comprising:
   one or more processors;
   a network interface operatively coupled to the one or more processors and arranged for bidirectional communications with a plurality of radio nodes (RNs) in the small cell RAN; and
   memory operatively coupled to the one or more processors, the memory storing computer-readable instructions which, when executed by the one or more processors, implement a method for allocating a plurality of channels to the plurality of RNs in the small cell RAN, comprising:
   i. selecting an initial RN from among the plurality of RNs;
   ii. assigning a first channel of the plurality of channels to the initial RN, the first channel being selected such that external interference experienced by the initial RN from sources other than the small cell RAN on the first channel is minimized;
   iii. selecting another RN among the plurality of RNs;
   iv. assigning a second channel of the plurality of channels to said another RN, the second channel being selected such that a metric reflective of an information carrying capacity of the RNs that have already been assigned one of the plurality of channels is maximized; and
   v. allocating the assigned channels to the respective RNs to which they have been assigned.

18. A centralized controller operable in a cell in a small cell radio access network (RAN), comprising:
   one or more processors;
   a network interface operatively coupled to the one or more processors and arranged for bidirectional communications with a plurality of radio nodes (RNs) in the small cell RAN; and
   memory operatively coupled to the one more processors, the memory storing computer-readable instructions which, when executed by the one or more processors, implement a method for allocating a plurality of channels to the plurality of RNs in the small cell RAN, comprising:
   i. selecting an individual RN from among a set of unassigned RNs in the plurality of RNs;
   ii. selecting a first channel of the plurality of channels to be assigned to the individual RN, the first channel being selected such that internal interference caused by the individual RN on all other RNs in the small cell RAN that are assigned the first channel plus external interference experienced by the individual RN from sources other than the small cell RAN on the first channel is minimized;
   iii. repeating steps (i) and (ii) for each of the RNs in the set of unassigned RNs to obtain a first assignment of the plurality of channels, wherein the individual RNs are selected in a first sequence;
   iv. repeating steps (i)-(iii) k times, k being an integer greater than 2, to obtain k assignments of the plurality of channels, the individual RNs being selected in a different sequence during each repetition;

v. allocating one of the k assignments of the plurality of channels to the RNs in the plurality of RNs, the allocated one of the k assignments being the assignment that maximizes an information carrying capacity of the RNs.

19. The centralized controller of claim 17, wherein the memory operatively coupled to the one or more processors is configured to store computer-readable instructions which, when executed by the one or more processors, cause the centralized controller to repeat steps (iii)-(v) for any remaining ones of the plurality of RNs in the small cell RAN.

20. The centralized controller of claim 17, wherein the memory operatively coupled to the one or more processors is configured to store computer-readable instructions which, when executed by the one or more processors, cause the centralized controller to select the initial RN by selecting an RN that causes the metric reflective of internal interference caused by the selected RN at all other RNs in the plurality of RNs to be minimized.

21. The centralized controller of claim 20, wherein the plurality of RNs in the small cell RAN operate using at least one pre-established channel prior to assigning the plurality of channels, and wherein the memory operatively coupled to the one or more processors is configured to store computer-readable instructions which, when executed by the one or more processors, cause the centralized controller to determine the metric reflective of internal interference from radio environment monitoring (REM) scans on the at least one pre-established channel.

22. The centralized controller of claim 17, wherein the memory operatively coupled to the one or more processors is configured to store computer-readable instructions which, when executed by the one or more processors, cause the centralized controller to select the initial RN in a random manner.

23. The centralized controller of claim 18, wherein the memory operatively coupled to the one or more processors is configured to store computer-readable instructions which, when executed by the one or more processors, cause the centralized controller to predict the information carrying capacity of the plurality of RNs for each of the k assignments.

24. The centralized controller of claim 23, wherein the memory operatively coupled to the one or more processors is configured to store computer-readable instructions which, when executed by the one or more processors, cause the centralized controller to predict the information carrying capacity of the RNs for each of the k assignments by processing one or more measurement values obtained from messages received by the RNs from a plurality of user equipments (UEs) to compute a set of derivatives and determining the information carrying capacity of the RNs as a function of the computed set of derivatives.

25. The centralized controller of claim 24, wherein the set of derivatives comprises a signal-to-interference-and-noise ratio (SINR) at a plurality of spatial locations in an environment at which the plurality of UEs are located when the one or more measurement values in the messages are measured.

* * * * *